March 17, 1970   P. C. JOHNSON   3,500,572
ROD HANDLE MATERIAL
Filed Jan. 26, 1968

INVENTOR.
PAUL C. JOHNSON
BY
Orrin W. Haugen
ATTORNEY 3,500,572
ROD HANDLE MATERIAL
Paul C. Johnson, Spirit Lake, Iowa, assignor to Berkley
& Company, Inc., Spirit Lake, Iowa, a corporation of
Iowa
Filed Jan. 26, 1968, Ser. No. 700,803
Int. Cl. A01k 87/00
U.S. Cl. 43—23   4 Claims

ABSTRACT OF THE DISCLOSURE

A fishing rod assembly comprising a gripping handle having a shaft member secured thereto. The handle has a generally rigid core and a covering consisting essentially of a substantially closed but partially open cell frothed polypropylene polymer having a density of between about 4 and 5 pounds per cubic foot, the diameter of the cells being generally less than about 0.02 inch in diameter. The covering is generally hydrophobic, and does not become slippery when wet.

---

Figures 1, 2:
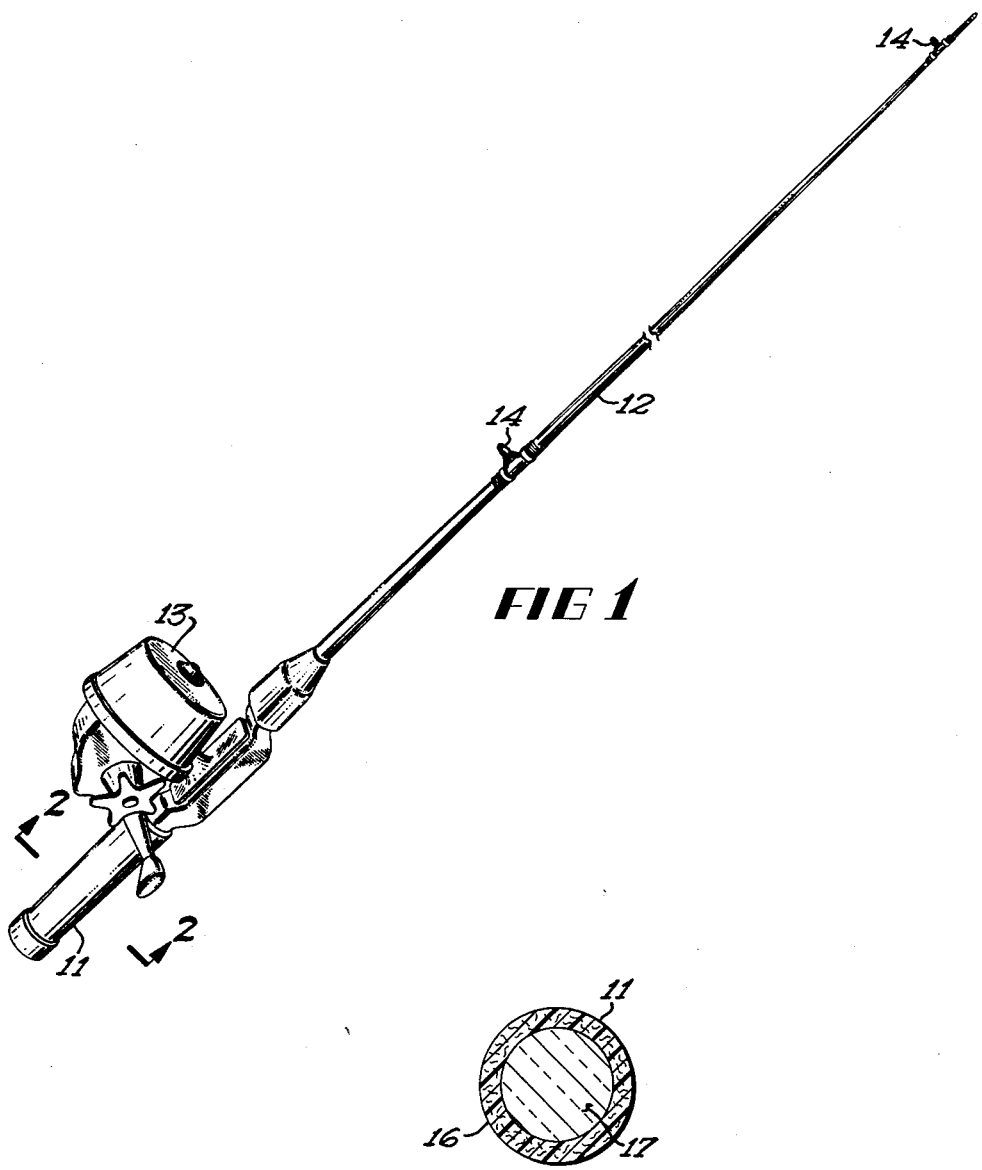

The present invention relates generally to fishing rod assemblies, and more specifically to fishing rod assemblies having a gripping handle wherein the gripping handle consists essentially of a frothed polypropylene polymer. Fishing rods have traditionally or normally utilized gripping handles which are fabricated from natural cork, a substance which does not occur in the United States. Cork is a desirable material because of its general resiliency, along with its tendency to be at least partially hydrophobic. After extended periods of exposure to the oxidizing effects of air, natural cork deteriorates and becomes brittle, crumbly, soft and spongy, and hence may become useless for its intended purpose.

In accordance with the present invention, it has been discovered that foamed polypropylene having certain physical properties is a highly desirable material for fabricating gripping handles for fishing rods. Specifically, the frothed polypropylene has a density of between about 4 and 5 pounds per cubic foot, and has a cell diameter of less than about 0.02 inch, and preferably about 0.010 inch. The frothed material has a substantially closed, but partially open cell configuration. The polymer, when frothed, therefore contains a modest amount of open cells. The wall thickness of the cell is preferably in the range of about $4 \times 10^{-4}$ inches. This material is resilient, resistant to oxidation or deterioration, hydrophobic, but yet completely dyeable. The texture is regular, and is resistant to the formation of wounds which frequently occurs in natural cork substances.

It is therefore an object of the present invention to provide an improved fishing rod assembly utilizing a gripping handle which consists essentially of frothed polypropylene polymer having a density of between about 4 and 5 pounds per cubic foot, and with a cell diameter generally less than about 0.02 inch.

It is yet a further object of the present invention to provide an improved fishing rod assembly having a gripping handle which is both dyeable and hydrophobic, and which is generally resistant to deformation caused by impact or other forces.

Other and further objects of the present invention will become apparent from a review of the following specification, appended claims, and accompanying drawing wherein:

FIGURE 1 is a perspective view of a fishing rod provided with a gripping handle in accordance with the present invention; and FIGURE 2 is a vertical sectional view taken along the line and in the direction of the arrows 2—2 of FIGURE 1.

In accordance with the preferred modification of the present invention, the fishing rod assembly generally designated 10 includes a gripping handle member 11 and a shaft member 12 secured to the gripping handle. Also, as is conventional, a reel 13 is coupled to the rod assembly as shown. Also, as is conventional, ferrules 14—14 are provided along the extent of the shaft.

The gripping handle member 11 includes an outer covering 16 which encloses the core member 17. The core member may be prepared from any suitable substance, such as wood, metal, or the like. When metal is utilized, it is frequently desirable to employ a hollow tubular structure in order to minimize the weight of the finished product.

Turning now to the composition of the outer covering member 16, this member consists essentially of a substantially closed, but partially open cell frothed polypropylene polymer. The polymer, when frothed, normally provides a finished product having substantially all, but not all of its cells closed. The density of the outer covering member 16 is preferably between 4 and 5 pounds per cubic foot; however, it is preferred, for most purposes, that the density be about 4 pounds per cubic foot. The consistency, resiliency, and resistance to mechanical damage is superior when densities in the range of about 4 pounds per cubic foot are employed, with more dense materials tending to be less resilient or flexible, and less dense materials being generally mechanically unsound. The cell diameter of the material is preferably in the range of about 0.010 inch; however materials having cell diameters of up to about 0.02 inch may be successfully employed. When larger cell diameters are considered, the structure is somewhat more porous than is desirable for fishing rod assemblies, and hence the desired resiliency and hydrophobic nature may be at least partially lost.

Since the material is generally hydrophobic, water is repelled, and the surface texture does not become slippery when wet. This is a highly desirable feature in fishing rods, as can be readily appreciated. If desired, for purposes of rendering the material even more hydrophobic, the surface may be sealed by means of flame polishing or the like.

The material may be formed to the desired shape by molding, but may also be cut from bulk structures, and formed by means of heat and pressure. For heat forming, temperatures in excess of about 300° F. and pressures in excess of about 20 p.s.i. are required. As distinguished from cork, it is not necessary to form blanks from disc segments or the like. Bulk foamed polypropylene of this type is commercially available.

The nature of the substance is such that it is readily cleanable, sheds dirt, and is resistant to gasoline or other similar materials normally used by fishermen.

Gripping handles prepared in this fashion are generally superior in performance to the traditional natural cork, and can be fabricated far more economically.

It will, of course, be understood that various changes may be made in the form, details, arrangements and proportions of the parts without departing from the scope of the invention.

What is claimed is:
1. In a fishing rod asembly comprising a gripping handle having a shaft member secured thereto:
   (a) said handle comprising a generally rigid core and a covering consisting essentially of a substantially closed but partially open cell frothed polypropylene polymer having a density of between about 4 and 5 pounds per cubic foot, the diameter of the cells being generally less than about 0.02 inch.
2. The fishing rod assembly as defined in claim 1 being particularly characterized in that the cell diameter is about 0.010 inch.
3. The fishing rod assembly as defined in claim 1 being particularly characterized in that the cell wall thickness is about $4 \times 10^{-4}$ inches.
4. The fishing rod assembly as defined in claim 1 being particularly characterized in that the surface of said gripping handle is sealed.

References Cited

UNITED STATES PATENTS

| | | | |
|---|---|---|---|
| 2,526,293 | 10/1950 | Stark | 43—23 |
| 2,699,622 | 1/1955 | Stevens | 43—23 |
| 2,853,400 | 9/1958 | Ahlbin | 145—61 X |
| 3,072,955 | 1/1963 | Mitchell. | |
| 3,311,375 | 3/1967 | Onions | 273—75 X |

SAMUEL KOREN, Primary Examiner

J. H. CZERWONKY, Assistant Examiner

U.S. Cl. X.R.

273—75, 81